United States Patent
Laurell et al.

(10) Patent No.: US 6,187,446 B1
(45) Date of Patent: Feb. 13, 2001

(54) CARRIER MATRIX FOR INTEGRATED MICROANALYSIS SYSTEMS, METHOD FOR THE PRODUCTION THEREOF AND USE OF THE SAME

(75) Inventors: Thomas Laurell; Johan Drott, both of Lund; Lars Rosengren, Vänge; Kjell Lindström, Höllviken, all of (SE)

(73) Assignee: Pharmacia Biotech AB, Uppsala (SE)

( * ) Notice: Under 35 U.S.C. 154(b), the term of this patent shall be extended for 0 days.

(21) Appl. No.: 08/930,273

(22) PCT Filed: Mar. 28, 1996

(86) PCT No.: PCT/SE96/00410

§ 371 Date: Nov. 4, 1997

§ 102(e) Date: Nov. 4, 1997

(87) PCT Pub. No.: WO96/30934

PCT Pub. Date: Oct. 3, 1996

(30) Foreign Application Priority Data

Mar. 29, 1995 (SE) ..................... 9501116

(51) Int. Cl.[7] .............. B32B 13/04; B31D 3/00; G01N 30/02
(52) U.S. Cl. ............ 428/446; 428/172; 428/188; 428/318.6; 216/56; 216/79; 73/19.02; 73/23.35; 73/61.52
(58) Field of Search ............ 428/156, 172, 428/137, 141, 149, 166, 188, 304.4, 446, 428, 318.6, 409; 216/56, 79; 438/719; 73/19.02, 23.35, 61.52

(56) References Cited

U.S. PATENT DOCUMENTS

| | | | |
|---|---|---|---|
| 4,801,380 | * | 1/1989 | Parker et al. ............ 210/500.21 |
| 5,139,624 | | 8/1992 | Searson et al. . |
| 5,427,648 | | 6/1995 | Pamulapati et al. . |
| 5,458,735 | * | 10/1995 | Richter et al. ............ 156/662.1 |

FOREIGN PATENT DOCUMENTS

| | | |
|---|---|---|
| 63-257653 | 10/1988 | (JP) . |
| 04107155 | 4/1992 | (JP) . |
| 0534474 | 3/1993 | (JP) . |
| 9620401 | 7/1996 | (WO) . |

* cited by examiner

*Primary Examiner*—Donald Loney
(74) *Attorney, Agent, or Firm*—Birch, Stewart, Kolasch & Birch, LLP.

(57) ABSTRACT

A silicon-based carrier matrix having a high ratio of surface area to volume is intended for use in integrated microanalysis systems. The carrier matrix comprises at least one layer of microporous silicon on a body of monocrystalline silicon. A method for producing the carrier matrix comprises electrochemical etching of a body of monocrystalline silicon, thereby to form at least one layer of microporous silicon on this body. The use of the carrier matrix for chemical sensors in integrated microanalysis systems, as well as in various sorts of chromatography, is also disclosed.

30 Claims, 3 Drawing Sheets

Figure 1:
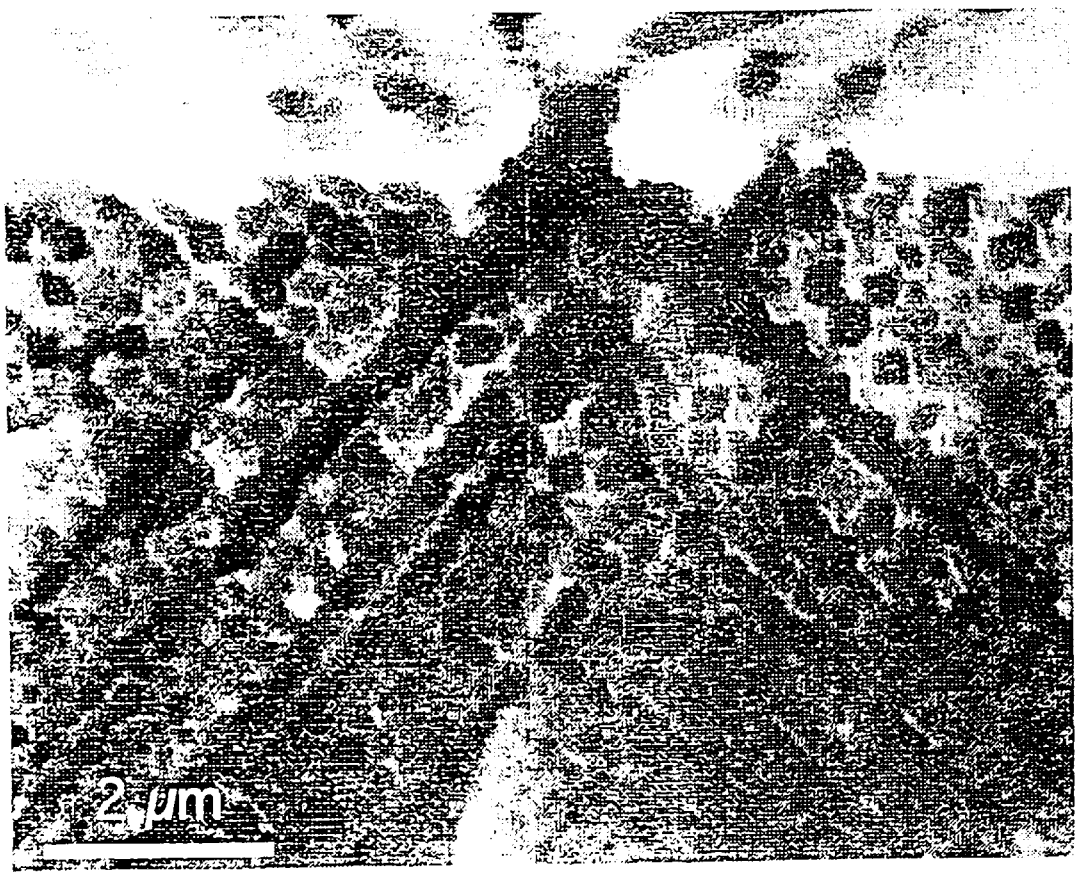

CARRIER MATRIX FOR INTEGRATED MICROANALYSIS SYSTEMS, METHOD FOR THE PRODUCTION THEREOF AND USE OF THE SAME

The present invention relates to a carrier matrix for integrated microanalysis systems, a method for the production thereof as well as the use of the same.

In the field of micromechanical technology and sensor construction, a rapid development of miniaturised chemical analysis systems is at present taking place, the aim being to totally integrate an analysis system on microscale. By "total integration" is here meant that pumps, flow ducts, flow valves, physical and chemical sensors, detectors etc. are produced on microscale on an underlying structure or as a composite unit consisting of several microcomponents made of different materials.

Several of the part components required to produce Micro Total Analysis Systems ($\mu$TAS) are easily available on today's market. Silicon-integrated micropumps for liquids can be obtained from a number of manufacturers (see, for instance, Büstgens B., Bacher W., Ehnes R., Maas D., Ruprecht R., Schomburg W. K., Keydel L., Micro-membrane Pump Manufactured by Molding, Proceedings of the 4th International Conference on New Actuators, Actuator '94, Bremen, 1994, 86–90, and van der Schoot B. H., Jeanneret S., van den Berg A. and de Rooij N. F., Microsystems for Flow Injection Analysis, Analytical Methods and Instrumentation, 1993, 1 No. 1 (1993) 38–42), as is the case with silicon-integrated microvalves (see, for instance, Shoji S., van der Schoot B., de Rooij N. and Esashi M., Smallest Dead Volume Microvalves for Integrated Chemical Analyzing Systems, Proceedings, Transducers 1991, San Fransisco, USA, 1991, 1052–1055, and Fahrenberg J., Maas D., Menz W., Schomburg W. K., Active Microvalve System Manufactured by the LIGA Process, Proceedings of the 4th International Conference on New Actuators, Actuator '94, Bremen, 1994, 71–74).

The chemical sensor element of the microanalysis systems is a key component and still is the factor checking the development of these systems.

The most common parameters studied in integrated analysis systems are the pH value and the dissolved gases, such as $O_2$ and $CO_2$ (Arquint P., Integrated Blood Gas Sensor for $pO_2$, $pCO_2$ and pH based on the Silicon Technology, PhD Thesis, 1994). If more complex compounds are to be studied, an enzymatic detection has to be included in, or associated with, the sensors in order to result in selective detection, which in turn increases the complexity of the systems.

Enzyme reactors (ER) are frequently used as detector units for complex analytes in the analysis in biological systems, one reason being their prolonged stability due to the excess of enzyme present. The sensor connected to the reactor usually measures basic parameters. Examples of such sensors are the Clark electrode and pH electrodes. The sensor may also measure any other parameter that the enzyme-catalysed reaction gives rise to.

As mentioned in the foregoing, the chemical sensor element is a factor checking the development of microanalysis systems. To enable a rapid and reproducible analysis in a flow, the carrier matrix for the chemical sensor has to have a high ratio of surface area to volume.

Silicon is the material most commonly used in microstructure technology. Also, silicon may advantageously be used in integrated enzyme reactors, since there exist standard methods for immobilising chemical reagents, for instance enzymes, by coupling to silicon-dioxide gels.

By integrating the chemical sensor element in microanalysis systems, large amounts of reagent in the reactor structures may be expected to prolong the life span of the sensor, whereas microbiosensors based on layered reagents with protecting membranes often have limited life spans owing to the gradual loss of chemical activity, for instance enzyme activity.

Previous efforts to achieve sufficient enzyme activity in integrated microreactors for measurement applications have been based on fairly simple flow cells. As carrier matrix in silicon-integrated enzyme reactors, use has been made of anisotropically-etched reactor structures, which have been designed as one long V-shaped channel (Murakami Y., Toshifumi T., Yokoyama K., Tamiya E., Karube I. and Suda M., Integration of Enzyme-Immobilized Column with Electrochemical Flow Cell Using Micromachining Techniques for a Glucose Detection System, Anal. Chem., 65, 1993, 2731–2735), several parallel V-shaped channels (Bin Xie, Bengt Danielsson, Petronella Norberg, Fredrik Winquist and Ingemar Lundström, Development of a Thermal Micro-Biosensor Fabricated on a Silicon Chip., Sensors and Actuators B, 6, 1992, 127–130) or several parallel, deep and vertical channels (Laurell T., Rosengren L. and Drott J., Silicon Wafer Integrated Enzyme Reactors., Biosensors & Bioelectronics, 1995, in press). The latter method involving the etching of deep vertical grooves in <110>-oriented silicon increases the available surface on the silicon wafer by a factor of at least 5 in relation to a smooth silicon surface.

As a result of the rapid development towards smaller and smaller components in the integrated microanalysis systems, there is today a considerable demand for a further increase in the ratio of surface area to volume in carrier matrices intended for use in such integrated microanalysis systems. This would enable smaller systems, which at the same time would remain active for a long period of time owing to a high capacity of chemical reagent.

Porous silicon is a well-known material which has long been used as electrically insulating material in semiconductor technology or as luminescent material in optronics research. Porous silicon has also been employed in micromechanics as sacrificial material in etching processes in micromechanical processing.

In analytical chromatography, silicon-dioxide-based microporous powder matrices (for instance controlled porous glass, CPG) are commonly used as carrier material for separation columns. The carrier material (the matrix) may either have a chemically-activated surface for the separation, or the microporous structure may in itself constitute a molecular separating medium.

Microporous pulverulent silicon dioxide is also to a large extent used as carrier matrix in enzyme reactors and systems for various sorts of chromatography, the surface-enlarging capacity of the matrix being used for connecting a large amount of an active chemical component to a fairly small carrier (Unger, Klaus K., 1979, Porous Silica, its Properties and Use as Support in Column Liquid Chromatography, Journal of Chromatography Library—Volume 16, ISBNO-44-41683-8, Elsevier Scientific Publishing Company, the Netherlands).

The size of the micropores in such microporous pulverulent matrices is of decisive importance for the properties of the carrier matrix. By checking the size of the micropores of the matrix, one obtains a defined carrier having well-characterised properties as regards capacity, separating capacity, surface enlargement, catalytic action, and so forth.

It has now been found that porous silicon is an excellent material for use as carrier matrix for integrated microanalysis systems where a high ratio of surface area to volume is aimed at.

One object of this invention is, therefore, to provide a silicon-based carrier matrix having a high ratio of surface area to volume for integrated microanalysis systems, said carrier matrix being characterised in that it comprises at least one layer of microporous silicon on a body of monocrystalline silicon.

Another object of the invention is to provide a method for producing a silicon-based carrier matrix having a high ratio of surface area to volume for integrated microanalysis systems, said method being characterised by electrochemical etching of a body of monocrystalline silicon for forming at least one layer of microporous silicon on said body.

A further object of the invention is to enable the use of said carrier matrix for chemical sensors in integrated microanalysis systems, in particular biochemical sensors, and especially as carrier matrix in enzyme reactors.

Yet other objects of the invention bear upon the use of said carrier matrix in chromatography, such as high-performance liquid chromatography (HPLC), affinity chromatography, ion-exchange chromatography, hydrophobic-interaction chromatography, hydrodynamic chromatography or steric exclusion chromatography.

The carrier matrix according to the invention enables an increase in the ratio of surface area to volume by a factor of at least 30, as compared with a smooth silicon surface.

Porous silicon is produced by electrochemical processing of monocrystalline silicon. As a result of a suitable choice of electrochemical parameters, an initially homogeneous silicon material may be given a markedly spongy structure. Since the production of porous silicon is process-compatible with the methods of producing silicon-integrated systems/components, one thus obtains unique possibilities of designing integrated microanalysis systems. Porous silicon can be produced within defined areas of the material of which the other silicon-integrated components are made, such that no non-process-compatible materials have to be supplied in the production of the carrier matrix.

Thus, porous silicon is a material conferring a great many advantages, both as regards effective surface area and from the point of view of production.

The size of the pores in porous silicon may be varied and be well controlled with the aid of the elecrochemical conditions prevailing in production.

According to the invention, the carrier matrix comprises at least one layer of porous silicon. It has been found that fairly thin layers with fine pores have a better effect than thicker layers with big pores. The layer thickness may vary within wide limits, for instance 1–200 $\mu$m, and is only restricted by the thickness of the matrix body.

In one embodiment of the invention, there is achieved a carrier matrix having a surface macrostructure of deep, parallel and vertical channels in a body of mono-crystalline silicon, the surface layer of the body surrounding the channels consisting of porous silicon. This type of carrier matrix is produced by two-stage electrochemical etching of a body of monocrystalline silicon under different etching conditions, the surface macro-structure of deep, parallel and vertical channels in said body being formed in a first anisotropic etching stage, and the microporous silicon layer being formed in a second electrochemical etching stage.

As mentioned in the foregoing, the deep, parallel and vertical channels are etched in the <110>-direction. The walls of the lamellae thus formed are defined by the <111>-planes. Etching of a microporous surface in the <111>-planes thus results in a combined effect due to the increased lamella macrosurface and the increased surface of the micropore structure.

In one embodiment of the invention, the carrier matrix is adapted for the immobilisation of a chemical reagent, preferably an enzyme, on the surface of the pores of the microporous silicon.

In another embodiment of the invention, the carrier matrix is adapted for use in chromatography, such as high-performance liquid chromatography (HPLC), affinity chromatography, ion-exchange chromatography, hydrophobic-interaction chromatography, hydrodynamic chromatography, and steric exclusion chromatography.

Since the size of the pores of porous silicon can be well controlled (Herino R., Bomchil G., Barla K., Bertrand C. and Ginoux J. L., Porosity and Pore Size Distributions of Porous Silicon Layers, J. Electrochem. Soc.: Solid State Science and Technology, August 1987, 1994–2000, Yon J. J., Barla K., Herino R. and Bomchil, The Kinetics and Mechanism of Oxide Layer Formation from Porous Silicon Formed on p-Si Substrates., J. Appl. Phys., 63 (3) (1987) and Bomchil G., Herino R., Barla K. and Pfister J. C., Pore Size Distributions in Porous Silicon Studied by Adsorption Isotherms., J. Electrochem. Soc., Vol 130, No. 7, 1983, 1611–1614), porous silicon may be used for producing a carrier matrix intended for use in chromatography. Fairly thick wafers can be porously etched through the whole wafer (see Searson et al, U.S. Patent Specification 5,139,624). By crushing a thus-etched wafer, a silicon powder of extremely well-defined microporosity can be obtained. After sizing the particles of the powder, one thus obtains a silicon-based matrix of porous qualities, which have been defined with the aid of the electrochemical etching. When intended for use in chromatography applications, the carrier matrix is in conventional manner packed in columns.

Capillary chromatography is a rapidly expanding field as regards chemical microanalysis systems. Thus, porous silicon may be put to use also in this field. A strong trend in the development of microanalysis systems is towards systems integrated on silicon. By etching well-defined areas of a silicon wafer, one may form porous capillaries, columns, reactor volumes and so forth, which may serve as chromatographic carrier matrices on microscale. These carrier matrices are incorporated along with other microanalysis components, so as to form fully-integrated chromatographic microsystems. As indicated in the foregoing, the properties of the carrier matrix can be defined by a suitable choice of electrochemical parameters.

By associating different chemically active components with the carrier matrix with the aid of suitable surface chemistry, the matrix may be used as ion-exchange column, sizing column, affinity column or enzyme reactor.

Porous silicon is obtained as a result of electrochemical etching of monocrystalline silicon in water-/ethanol-containing hydrofluoric acid. However, the mechanism governing the formation of porous silicon is not yet fully explained. Zhang et al (X. G. Zhang, S. D. Collins and R. L. Smith. Porous Silicon Formation and Electro-polishing of Silicon by Anodic Polarization in HF Solution. J. Electrochem. Soc. 136 (5) (1989), 1561–1565) has reported that a low current density and a high concentration of HF promotes the formation of porous silicon, as does a high doping level (S. Barret, F. Gaspard, R. Herino, M. Ligeon, F. Muller and I. Ronga, Porous Silicon as a Material in Microsensor Technology, Sensors and Actuators A, 33 (1992) 19–24). Herino et al (R. Herino, G. Bromchil, K. Barla, C. Bertrand and J. L. Ginoux, Porosity and Pore Size Distributions of Porous Silicon Layers, J. Electrochem. Soc.: Solid State Science and Technology, August 1987, 1994–2000) describe how the pore radius of porous silicon can be adjusted with the aid of the current density. Thus, an increase in current density results in an increase in pore radius.

When used as carrier matrix in integrated microbioreactors, porous silicon may enhance the enzyme activity by a factor of at least 30, as compared with a smooth silicon surface.

The activity gain of the carrier matrices according to the invention exhibiting the highest activity gains have a flow-rate dependency, as is not the case for a polished silicon surface serving as carrier matrix. One explanation for this flow-rate dependency is that the substrate transport is a more limiting factor in the case of the porous surface than in the case of the polished surface. To enable optimum utilisation of e.g. an enzyme or another chemically active component through the entire porous area, the concentration of bulk substrate has to be maintained in the vicinity of the porous layer.

In systems having the dimensions of microflow systems, laminar conditions prevail, which means that the main factor of the mixture is controlled by diffusion processes, and the degree of utilisation of the enzyme or the chemically active component is thus determined by the diffusion interface. In the case of a polished silicon surface, the enzyme or the chemically active component may be assumed to constitute a monolayer adjoining the substrate interface, and thus being more easily saturated with substrate than in the case of a porous structure, which explains the lower flow-rate dependency. In the porous structure, the enzyme or the chemically active component is located deep down in the pores, and the outer coated porous area has to be saturated with substrate before recourse is had to the deeper porous area.

In many practical applications, the flow rate through the carrier matrix is low. Low flow rates in microanalysis systems are dominated by laminar conditions. Microanalysis systems serving as carrier matrices for chemically active components tend to exhibit a strong flow-rate dependency if the component associated with the carrier matrix has a high chemical activity. Owing to the laminar flow rate profile, the substrate transport to the active surface is restricted by the diffusion. This dependency on diffusion can be reduced in various ways. The immobile laminar diffusion region close to the chemically active layer is reduced by an increase in the flow rate. The resulting increase in substrate transport velocity leads to a higher chemical activity, as has been shown.

The laminar flow may also be disturbed on purpose, thereby to produce a certain local agitation of the substrate, enabling more effective utilisation of the carrier matrices according to the invention in microanalysis systems. This can be achieved by supplying mechanical energy, e.g. in the form of ultrasound.

In actual practice, this can be performed by mounting an ultrasonic crystal at the back of a silicon wafer having a porous silicon layer according to the invention. The ultrasonic crystal is provided with drive electronics and is thus able to transmit ultrasound into the flow channels of the carrier matrix, where the microagitation in the substrate results in a higher chemical yield.

Figure 2:
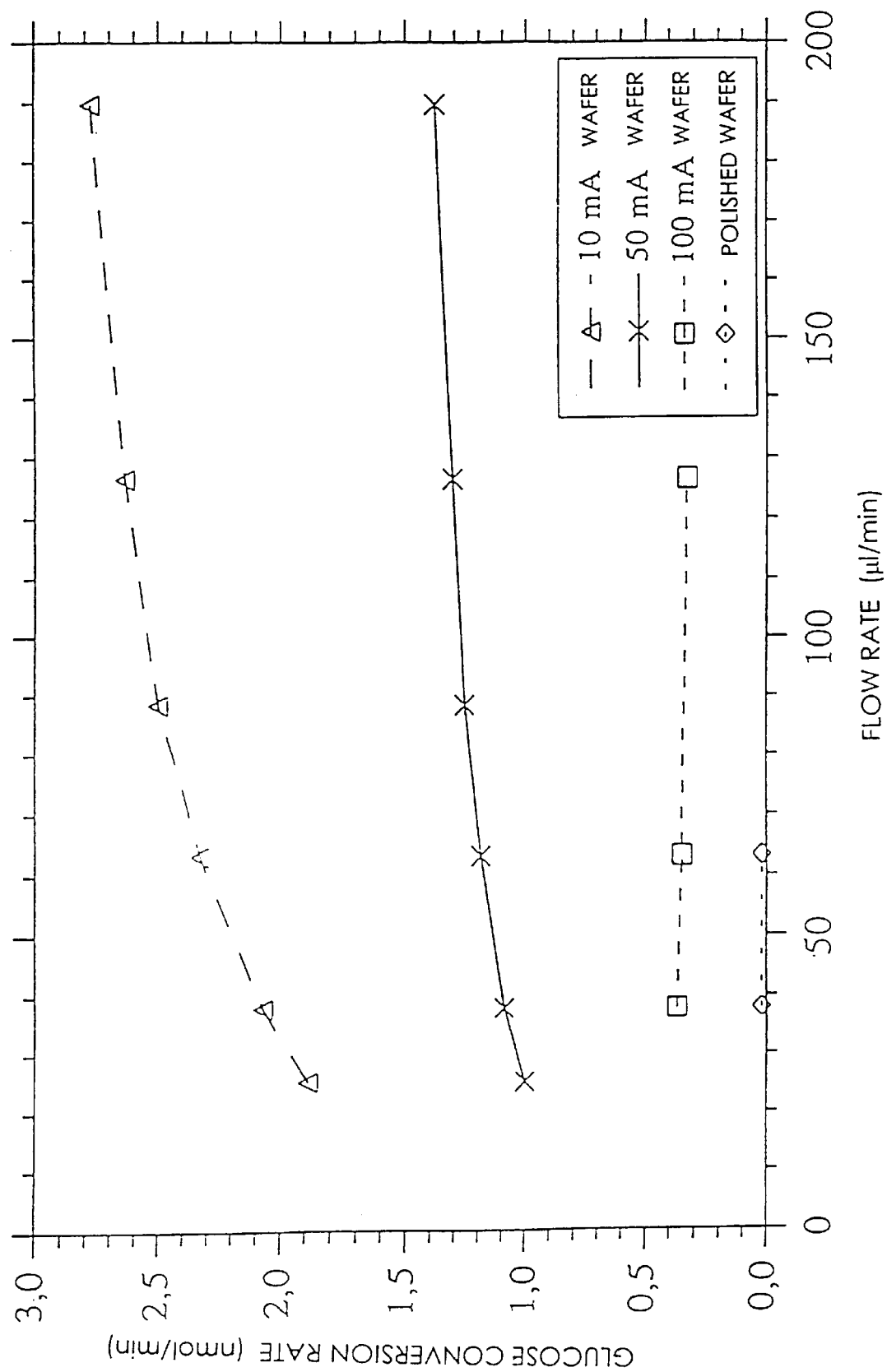
Figure 3:
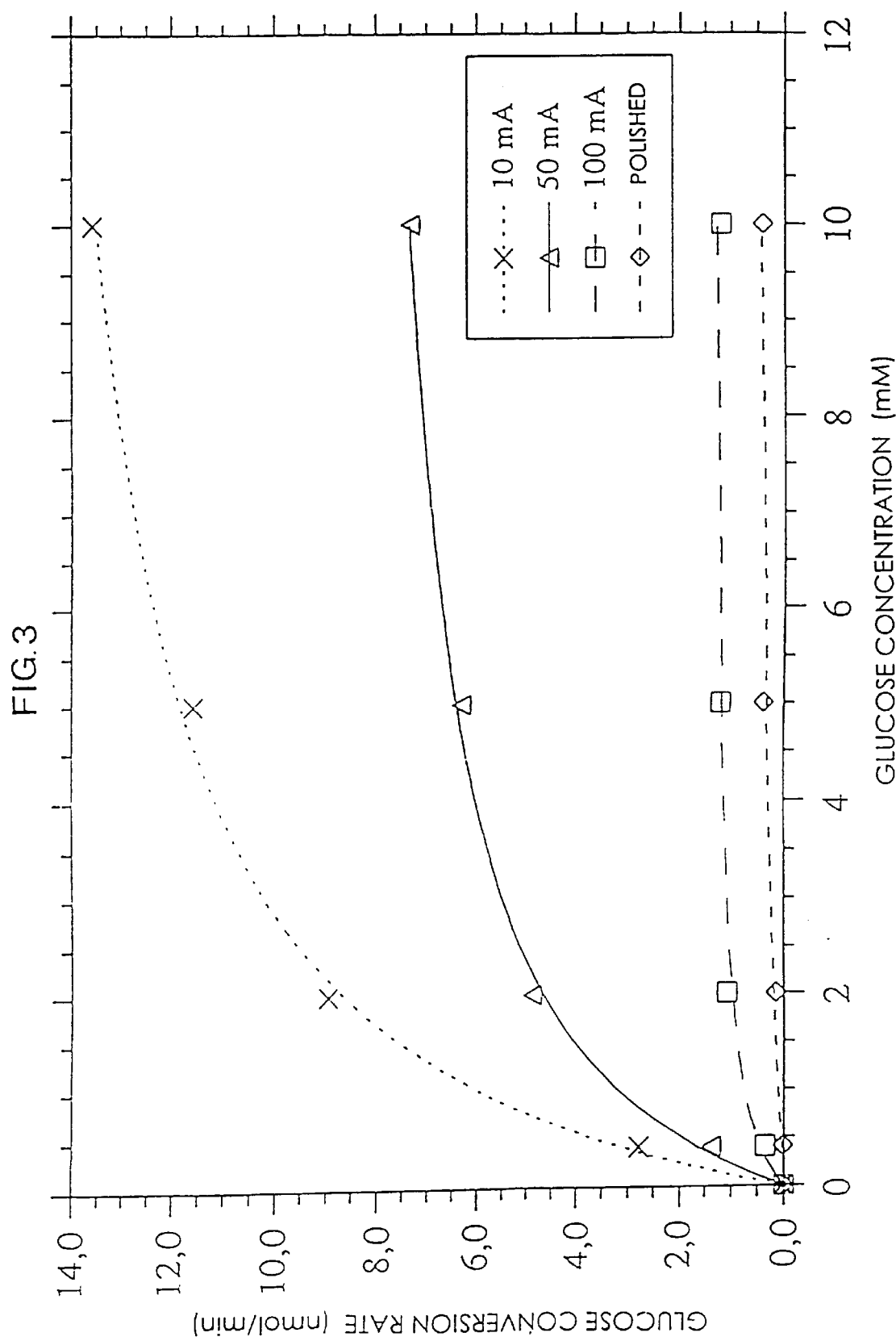

The invention will now be described in more detail with reference to the accompanying drawings, in which FIG. 1 is a cross-section of the porous area of the wafer produced at 10 mA/cm$^2$, FIG. 2 illustrates the glucose conversion rate as a function of the flow rate for the three porous wafers as well as for a polished silicon wafer (the flow-rate dependency was more pronounced for the wafers that had been etched at a lower current density), and FIG. 3 illustrates the glucose conversion rate as a function of the glucose concentration for each silicon wafer as well as for a polished wafer (the flow-rate dependency was more pronounced for the wafers having a finer pore structure).

EXAMPLES

Production of Carrier Matrices

Three wafers with porous silicon layers were produced by electrochemical etching of <111>-oriented silicon of N-type, 1–6 Ωcm, in a solution of HF (40%) and ethanol (96%) in a ratio of 7:1. During the etching operation, the solution was agitated with the aid of ultrasound. The etching was carried out in the dark at room temperature and at different current densities for each wafer. Constant current densities of 10 mA/cm$^2$, 50 mA/cm$^2$ or 100 mA/cm$^2$ were applied during 50 min to each wafer. The lower the current density, the finer the surface structure of the resulting surface. The depth of the porous area for each wafer is indicated in Table 1 below. In order to show the real depth of the porous area, each wafer was broken to pieces, and the cross-section was examined. Thus, FIG. 1 shows the cross-section of the wafer produced at 10 mA/cm$^2$, the depth of the porous area being indicated in Table 1 below.

TABLE 1

| | Pore depth in the porous areas | | |
|---|---|---|---|
| | Etching conditions | | |
| | 10 mA/cm$^2$, 1 h | 50 mA/cm$^2$, 1 h | 100 mA/cm$^2$, 1 h |
| Pore depth | 40 μm | 140 μm | 230 μm |

Enzyme Immobilisation

The three wafers with porous silicon and a wafer of polished silicon introduced for comparative purposes were silanised in a cup containing 3-aminopropyltriethoxysilane (Sigma Chemical Co, St Louis, US) and 1 g of APTES in 9 ml of water, the pH value being adjusted to 3.5 with the aid of 6 M HCl. The silanisation was performed in a water bath at 75° C. for 3 h and was followed by abundant washing with water for 30 min. Careful agitation took place during each stage of the immobilisation process. Then, the wafers were placed in a solution of 2.5% glutaraldehyde (GA) (grade II, Sigma Chemical Co, St Louis, US) in 0.1 M phosphate buffer (PBS) for 2 h. The GA activation was followed by washing with PBS for 30 min. Finally, glucose oxidase (GOD) was associated with the wafers as a result of a treatment with 10 mg of glucose oxidase (EC 1.1.3.4, type X-S, Aspergillus niger) in 2 ml of PBS overnight (8 h), which was followed by washing in PBS for 1 h.

Determination of Enzyme Activity

The enzyme activities of the different silicon wafers were recorded in a flow-through cell. The wafers were mounted in the flow-through cell in such a manner that a sealing ring delimited a circular area (48 mm$^2$) of the wafer subjected to the measurement. Trinder reagent (von Gallati H., Aktivitätsbestimmung von Peroxidase mit Hilfe des Trinder-Reagens, J. Clin. Chem. Clin. Biochem., 15 November 12, 1977, 699–703), containing glucose in the concentrations 0.4, 2, 5 and 10 mM and peroxidase (E.C. 1.11.1.7, type VI, Sigma Chemical, St Louis, US), was pumped through the cell. The flow rate was set with the aid of an injection pump controlled by a step motor. An HPLC-absorbance detector (Waters 486 Tunable Absorbance Detector (Millipore Corp., Milford, Mass., US)) recorded the development of coloured compound at 492 nm as the glucosidase converted glucose to gluconic acid and hydrogen peroxide, while the Trinder reagent produced the coloured compound on the basis of the amount of hydrogen peroxide produced. During the measurement of the enzyme activity, the colour reagent was pumped through the reactor or was allowed to pass through it, so as to provide an indication of the absorbance change generated by the silicon wafer. The degree of glucose conversion was determined on the basis of the absorbance measurements.

The examination of the porous wafers revealed that these exhibited a flow-rate dependency, whereas the polished wafer showed no such dependency in the flow-rate area examined. Thus, FIG. 2 shows the degree of glucose conversion as a function of the flow rate of each of the silicon wafers. The measurements were performed at increasing flow rates until the degree of conversion was found to level out.

Furthermore, the maximum degree of conversion of each wafer was drawn up as a function of the glucose concentration. FIG. 3 shows the improving effect the microporous silicon surface had on the enzyme activity, as compared with the polished silicon surface.

The highest conversion rates recorded for each wafer are indicated in Table 2 below, which also indicates the activity gain in relation to the polished wafer.

TABLE 2

The highest conversion rate and the gain factor in relation to the polished wafer

| | Etching conditions | | | |
| --- | --- | --- | --- | --- |
| | 10 mA/cm$^2$, 1 h | 50 mA/cm$^2$, 1 h | 100 mA/cm$^2$, 1 h | Polished |
| Conversion rate | 13.6 | 7.3 | 1.2 | 0.4 |
| Gain factor | 33 | 18 | 3 | 1 |

After two weeks, the wafer produced at 10 mA/cm$^2$ was tested with a view to examining the stability of the immobilised enzymes. The wafers were stored in cooled condition in PBS, pH 7, in the meantime. Trinder reagent with 5 mM glucose was pumped at varying flow rates through the reactor previously used, in which the wafer had been mounted. No loss of enzyme activity was observed at the porous surface.

Results

It is evident from these results that porous silicon may serve to enhance the enzyme activity in integrated microbioreactors. As appears from Table 2, the enzyme activity in the case of the large-pore wafer (produced at 100 mA/cm$^2$) was only three times as high as that in the case of the polished wafer, whereas the enzyme activity in the case of the fine-pore wafer (produced at 10 mA/cm$^2$) was more than 30 times as high as that in the case of the polished wafer.

As appears from FIG. 2, the wafers exhibiting the highest activity gains have a flow dependency, while no such dependency was observed in the case of the polished wafer.

What is claimed is:

1. A silicon-based carrier matrix having an increase in ratio of surface area to volume by a factor of at least 30, as compared with a smooth silicon surface, for integrated microanalysis systems, characterised in that it comprises at least one layer of microporous silicon on a body of monocrystalline silicon.

2. A silicon-based carrier matrix as claimed in claim 1, characterised in that said body of monocrystalline silicon has a surface macrostructure of deep, parallel and vertical channels.

3. A silicon-based carrier matrix as claimed in claim 1, characterised in that it has been rendered pulverulent by crushing of the layer of microporous silicon.

4. A silicon-based carrier matrix as claimed in claim 1, characterised in that the layer of microporous silicon is located within well-defined areas of said body of monocrystalline silicon.

5. A silicon-based carrier matrix as claimed in claim 4, characterised in that said well-defined areas are made up of capillaries, columns or defined reactor volumes.

6. A silicon-based carrier matrix as claimed in claim 1, characterised in that it is produced by electrochemical etching of monocrystalline silicon.

7. A silicon-based carrier matrix as claimed claim 1, characterized in that it is adapted for the immobilization of a chemical reagent on the surface of the pores of the microporous silicon by employing pores of varying size.

8. A silicon-based carrier matrix as claimed in claim 1, characterized in that it is adapted for the immobilization of an enzyme on the surface of the pores of the microporous silicon by employing pores of varying size.

9. A silicon-based carrier matrix as claimed in claim 1, characterized in that it is adapted for use in chromatography by employing pores of varying size.

10. A silicon-based carrier matrix as claimed in claim 9, characterized in that it is adapted for use in high-performance liquid chromatography, affinity chromatography, ion-exchange chromatography, hydrophobic-interaction chromatography, hydrodynamic chromatography or steric exclusion chromatography by employing pores of varying size.

11. A silicon-based carrier matrix as claimed in claim 1, characterised in that it is adapted for local agitation of analysis substrates by the supply of mechanical energy.

12. A silicon-based carrier matrix as claimed in claim 11, characterized in that it is adapted for the supply of ultrasound by mounting an ultrasonic crystal in back of the monocrystalline silicon and providing drive electronics.

13. A silicon-based carrier matrix as claimed in claim 2, characterized in that it is adapted for use in chromatography by employing pores of varying size.

14. A silicon-based carrier matrix as claimed in claim 3, characterized in that it is adapted for use in chromatography by employing pores of varying size.

15. A silicon-based carrier matrix as claimed in claim 4, characterized in that it is adapted for use in chromatography by employing pores of varying size.

16. A silicon-based carrier matrix as claimed in claim 5, characterized in that it is adapted for use in chromatography by employing pores of varying size.

17. A silicon-based carrier matrix as claimed in claim 6, characterized in that it is adapted for use in chromatography by employing pores of varying size.

18. A silicon-based carrier matrix as claimed in claim 7, characterized in that it is adapted for use in chromatography by employing pores of varying size.

19. A silicon-based carrier matrix which exhibits an increase in enzymatic activity by a factor of at least 30 when a reagent is immobilized thereon, as compared with a smooth silicon surface having said reagent immobilized thereon, for integrated microanalysis systems, characterized in that it comprises at least one layer of microporous silicon on a body of monocrystalline silicon.

20. A silicon-based carrier matrix which exhibits an increase in chemical activity by a factor of at least 30 when a reagent is immobilized thereon, as compared with a smooth silicon surface having said reagent immobilized thereon, for integrated microanalysis systems, characterized in that it comprises at least one layer of microporous silicon on a body of monocrystalline silicon.

21. The silicon-based carrier matrix of claim 20, which includes said reagent immobilized thereon.

22. A method for producing a silicon-based carrier matrix having an increase in ratio of surface area to volume by a factor of at least 30, as compared with a smooth silicon surface, for integrated microanalysis systems, comprising:

electrochemical etching of a body of monocrystalline silicon for forming at least one layer of microporous silicon on said body.

23. A method as claimed in claim 22, further comprising:

etching said body of monocrystalline silicon in a first anisotropic etching stage and a second electrochemical etching stage under different etching conditions;

forming, in said first anisotropic etching stage, a surface macrostructure comprising deep, parallel and vertical channels in said body; and forming, in said second electrochemical etching stage, at least one layer of microporous silicon on said body of monocrystalline silicon surrounding said vertical channels.

24. An integrated microanalysis method, comprising:

contacting a sample to be tested, in an integrated microanalysis system, with a chemical sensor comprising a silicon-based carrier matrix having an increase in ratio of surface area to volume by a factor of at least 30, as compared with a smooth silicon surface, wherein said carrier matrix comprises at least one layer of microporous silicon on a body of monocrystalline silicon; and measuring a chemical property of said sample.

25. The method as claimed in claim 24, wherein the chemical sensors are biochemical sensors.

26. The method as claimed in claim 24 or 25, wherein the integrated chemical sensors are enzyme reactors.

27. The method of the silicon-based carrier matrix as claimed in claim 1 in chromatography.

28. The method as claimed in claim 27, wherein the chromatography is high-performance liquid chromatography, affinity chromatography, ion-exchange chromatography, hydrophobic-interaction chromatography, hydrodynamic chromatography or steric exclusion chromatography.

29. The method as claimed in claim 24, wherein the carrier matrix is adapted for local agitation of analysis substrates by the supply of mechanical energy.

30. The method as claimed in claim 29, wherein the carrier matrix is adapted for the supply of ultrasound by mounting an ultrasonic crystal in back of the body of monocrystalline silicon and providing drive electronics.

* * * * *